United States Patent [19]

Walton

[11] Patent Number: 4,580,041
[45] Date of Patent: Apr. 1, 1986

[54] ELECTRONIC PROXIMITY IDENTIFICATION SYSTEM WITH SIMPLIFIED LOW POWER IDENTIFIER

[76] Inventor: Charles A. Walton, 19115 Overlook Rd., Los Gatos, Calif. 95030

[21] Appl. No.: 559,712

[22] Filed: Dec. 9, 1983

[51] Int. Cl.⁴ .............................................. G06K 5/00
[52] U.S. Cl. .................................... 235/380; 235/488
[58] Field of Search ................................ 235/380, 488

[56] References Cited

U.S. PATENT DOCUMENTS 4,223,830  9/1980  Walton ................................ 235/380

Primary Examiner—Harold I. Pitts
Attorney, Agent, or Firm—Gerald L. Moore

[57] ABSTRACT

An identification system comprising a reader (10) including a first signal generator (12) for generating a first signal (F1) which is radiated by an antenna (17). An identifier (11) includes an antenna (20) receiving the first signal for transmission to a signal modulator (32) which operates to modulate the signal in accordance with a preassigned code for the identifier. The modulated signal is then used to periodically unload or change the reactance of the antenna (20) which action in turn changes the reactance of the reader antenna and consequent voltage on the reader antenna (17). By detecting the change in the voltage on the reader antenna the code of the identifier is determined. Power drain is minimized and power is used efficiently by unloading during modulation and by changing reactance without changing load.

10 Claims, 6 Drawing Figures

ELECTRONIC PROXIMITY IDENTIFICATION SYSTEM WITH SIMPLIFIED LOW POWER IDENTIFIER

FIELD OF THE INVENTION

This invention is an identification system of the type wherein a plurality of portable card type identifiers can be individually distinguished for authorizing financial transactions, for security purposes and similar individual identification.

RELATED PATENTS AND APPLICATIONS

U.S. Pat. No. 3,752,960, Electronic Identification and Recognition System, issued on Aug. 14, 1973 with Charles A. Walton as inventor;

U.S. Pat. No. 4,223,830, Identification System, issued on Sept. 23, 1980 with Charles A. Walton as inventor;

U.S. Pat. No. 4,236,068, Personal Identification and Signaling System issued on Nov. 25, 1980 with Charles A. Walton as inventor;

U.S. patent application Ser. No. 06/448,516, Electronic Proximity Identification System, filed on Dec. 10, 1982 with Charles A. Walton as inventor.

BACKGROUND OF THE INVENTION

The above disclose examples of credit card identifiers in which the identification is obtained by placing the card near a reader station. The user need not remove the card from the wallet or handbag and reading occurs in a fraction of a second. Each card bears a unique code with the coding typically being entered at the time of manufacture, although in some circumstances field change of the code is possible. In some systems the number of available codes is limited. Typical uses of such identifiers include access control, personal banking and transaction identification, and vehicle and freight car identification.

Such identification systems require the card identifiers to transmit a signal to the reader or otherwise emit an identification code which can be detected by the reader. This signal generation in some cases has been effected by incorporating a battery in the card to power a signal generating circuit. It is advantageous to have the reader supply the power to the identifier. One example is described in the above identified application Ser. No. 06/448,516 wherein the identifier card is powered by the signal from the reader. In this instance the identifier derives the power from the interrogating signal and utilizes that power to energize a radio frequency oscillator and signal generator for generating a signal which in turn is radiated back to the reader for identification purposes. It is desirable that the power requirements from the reader to the card be minimal so that (a) the radio frequency radiation from the reader have minimum impact on other users of the radio frequency spectrum and thereby minimize the possibility of governmental objection to the system, (b) the reader can be maintained compact and inexpensive, and (c) the distance at which the card can be energized and read can be greater.

It is the purpose of the present invention to provide a proximity system with a reader and portable identifier combination which is simple in design, has a large code population, wherein the identifier can readily be powered by the signal from the reader, and in which the power requirements of the card are minimal.

SUMMARY OF THE INVENTION

An identification system comprising a reader including a radio frequency first signal generator for generating a fixed frequency signal which is radiated by an antenna; and an identifier, typically in the form of a credit card, and including an antenna to receive the first signal. The received signal powers the identifier which includes a signal modulator. The signal modulator generates an encoded signal in accordance with a preassigned code recorded in the identifier which encoded signal is used to periodically increase or decrease the reactance of the identifier antenna and cause a reactive change in the circuit of the reader antenna. This charge in reactive value is detected, decoded and amplified by the reader to identify the identifier. Power drain is kept low by using reactive changes rather than resistive, and by using power interruption rather than power loading for encoding.

DESCRIPTION OF THE INVENTION

Figure 1:
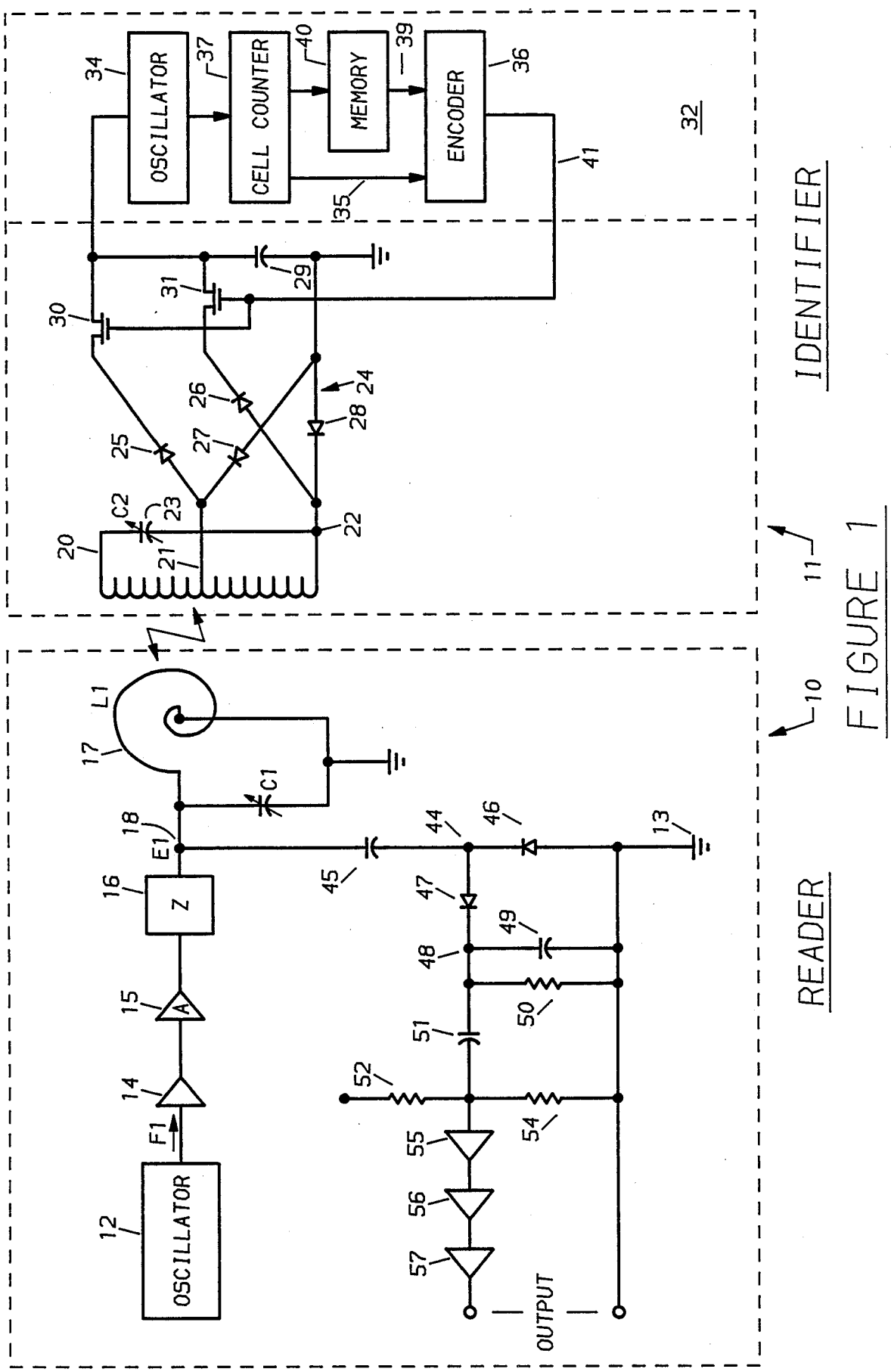
FIG. 1 is a diagram of a preferred embodiment of the reader and identifier.

In FIG. 1 is shown a preferred embodiment of the invention comprising a reader 10 and a single identifier 11. Usually the identifier is credit card size, although it may be larger for such purposes as vehicle and freight car identification, or smaller for placement in a ring or wristwatch. The identifiers need only be held in proximity to the reader for identification. Any number of identifiers can be used singularly with each reader.

The reader comprises a first oscillator 12 operating at a frequency F1. Preferably this oscillator operates at one of the industrial, scientific or medical bands, commonly called the ISM bands, with one preferred frequency being 13.56 megahertz. This oscillator drives an isolation amplifier 14, a power amplifier 15 and an impedance 16 to supply a signal to a loop antenna 17 through a node 18. The loop antenna 17 is connected in parallel with a tuning capacitor C1.

The purpose of the oscillator 12 is to supply a first signal suitable for energizing and interrogating any identifier 11 placed close to the antenna 17. The identifier 11 includes a loop antenna 20 which inductively couples the identifier to the reader through the antenna coil 17. The coil 17 acts as a primary of a radio frequency transformer while the coil 20 acts as a secondary.

The loop antenna 20 is tuned at or near to the transmitted frequency F1 of the reader. The tuning of this antenna is effected by adjustment of the capacitor C2. Between the tap 21 and the end 22 of the antenna is connected a full wave rectifying bridge which converts the AC voltage occurring in the antenna 20 to a DC voltage. The bridge is formed with the diodes 25, 26, 27 and 28 and a smoothing capacitor 29 is connected across the output of the bridge. Connected in series with the diodes 25, and 26 are the FET field effect transistors 30 and 31 controlled by a modulation signal supplied on line 41. When the transistors 30 and 31 are in the conduction mode, normal rectifying action occurs, and the coil 20 is loaded and the capacitor 29 is charged. When the transistors 30 and 31 are non-conductive or off, there is no load on the coil 20 and no rectifying action occurs.

In the quiescent mode, that is, for an unenergized identifier with no voltage on the FETs, the FETs are conductive (if they are depletion mode JFETs) and when the identifier is energized a voltage builds up on the capacitor 29. Alternatively, the FETs may be of the enhancement mode, and not initially conductive, in which case a bypass zener diode (not shown) is used to put an initial charge on to the capacitor 29. The voltage across the capacitor 29 is used to power the logic/memory circuit 32. The purpose of the logic/memory circuit is to provide intelligence and a modulating signal for systematically unloading the coil 20 in accordance with a code recorded in the memory 40 of the identifier.

In FIG. 1, the encoder output signal on the conductor 41 is applied to the coil 20 by turning on and off the FET transistors 30 and 31. For a junction mode n channel JFET, when the signal is up, the transistors conduct and normal rectifying action occurs to load the coil 20 and charge the capacitor 29. This is the standby mode. When the modulation signal is down, the transistors are nonconductive and there is no load on the coil 20 and practically no rectifying action occurs. For a p channel CMOS enhancement mode IGFET, the gate voltage is reversed, i.e. an up voltage turns the FETs off. Turning the FETs off causes the reactance level of coil 20 and capacitor 23 to increase as shown later.

When the FETs are off the voltage on the capacitor 29 drops to a reduced value. If there were a complete drop in that voltage the oscillator and logic circuits would cease to function and the system would fail. However as the voltage falls, the field effect transistors 30 and 31 reach a status wherein their drain/source voltage is within approximately 2 volts of the gate voltage of the conductor 41. In this circuit status the two field effect transistors do not completely turn off and there continues to be a limited but adequate voltage supplied to the oscillator and the logic circuit of the modulator so that the system continues to perform the necessary functions. Alternatively, to insure that some power always passes to the encoder, the FETs can be bypassed by a resistor or a Zener diode. These alternative bypass components are not shown on the drawing.

The voltage on coil 20 rises when it is unloaded, and the unloading is caused when FET transistors 30 and 31 are turned off by the modulation signal on line 41. This rise is due to the increased reactance of the coil 20 and capacitor C2 and causes reactive changes in coil 17, as shown in FIG. 2.

Figure 2:
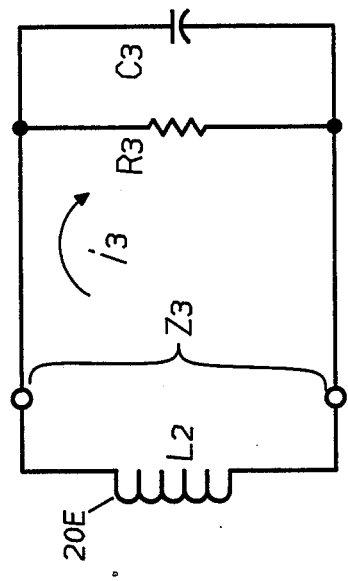
FIG. 2 shows the reactance variation of the reader antenna.

FIG. 2 illustrates the manner in which the unloading of the coil 20 is detected by the reader. The transmitting coil 17 initially is partially tuned by adjusting the capacitor C1. If the capacitance is decreased in value the capacitive reactance increases and the voltage E1 rises and passes through the peak resonance point and then falls. Changes in E1 due to reactance changes occur on the sides of the curve. Either side may be used to achieve the desired data communication, however the high-C low-X side has advantages for this invention and is used in the following explanation.

The reactive condition of the coil 20 and the capacitor C2 reflects capacitive reactance or inductive reactance into the coil 17. Whether it is inductive or capacitive is determined by whichever side of the tuning point the coil 20 and capacitor 23 are set. If set to couple inductive reactance from antenna 20 into antenna 17, then when modulation action of the unloading type occurs the value of inductive reactance coupled into the circuit of antenna 17 will increase. At the position A on FIG. 2 there is already excess inductive reactance in the circuit equivalent to insufficient capacitive reactance. The operating point will therefore move to position B. This reactance change causes a useful and detectable change in voltage at the node 18 of the reader.

During a normal data transfer operation the voltage E1 on the node 18 shifts between the values indicated by the points A and B. This change is maximized by intentionally operating the resonant circuit of the coil 17 and the capacitor C1 on the slope of the resonance curve and not on the peak resonance point. The source impedance of the amplifier 15 must be of sufficiently high value or this change in voltage will be attenuated by the source impedance. To assure this sufficiently high impedance value, an impedance 16 is inserted between the amplifier 15 and the coil 17 to minimize attenuation due to the amplifier 15.

The equations and equivalent circuit which follow state the preceding in mathematical terms. The equations illustrate with precision the interaction between the identifier and the reader. The circuit relationship between identifier and reader is shown in FIG. 3. Conventional circuit notation for the components is used, as well as the numbers for this application. The resistors R1, R2, and R3 represent the losses present in a reactive circuit. The analysis given is for the input impedance between points Y and X in which point Y is ground and point X is the point where the useful signal voltage E1 appears. As ZXY varies due to action in identifier 11, current i1 and voltage E1 will vary.

To find the expression for ZXY, let W="omega"=radians per second; and j=the operator $\sqrt{-1}$.

For $Z1 = R1 + j(WL1 - 1/WC1)$ and $Z2 = R2 + j(WL2 - 1/WC2)$; then $$ZXY = \left(\frac{1}{WC1}\right)^2 \left[\frac{Z2}{Z1Z2 + (WM)^2}\right] - \frac{j}{WC1}$$

The preceding is one of several ways of presenting the results of this calculation. General conclusions are that: (1) If M is small or zero, as when the identifier is some distance away, the effect of Z2 drops out of the equations. When M is large, $(M = K\sqrt{L1L2})$, (close proximity) the effect of the the Z2 changes is maximum. (2) Small values of R1 and R2 increase the Q (where Q=WL/R) and increase the sensitivity of the circuit to reactive changes. (3) Changing the secondary resistance value R2 changes the reactive and resistive parts of ZXY. This statement (3) is valid whether R2 represents a series resistance or the shunt equivalent resistance. The data from the logic/memory makes its presence known by altering the value of R2, or the parallel equivalent value of R2, which is R3, as further explained.

The overall circuit impedance of the identifier is Z2. Z2 is formed of the inductance L2, and of capacitance and resistance. The capacitance and resistance form the impedance Z3. If the identifier resistance and capacitance are in series, they are labeled R2 and C2. If the identifier resistance and capacitance are in parallel they are labeled R3 and C3. Equations for converting between the two are given later. Both forms provide insight into the operating principles.

Figure 3A:
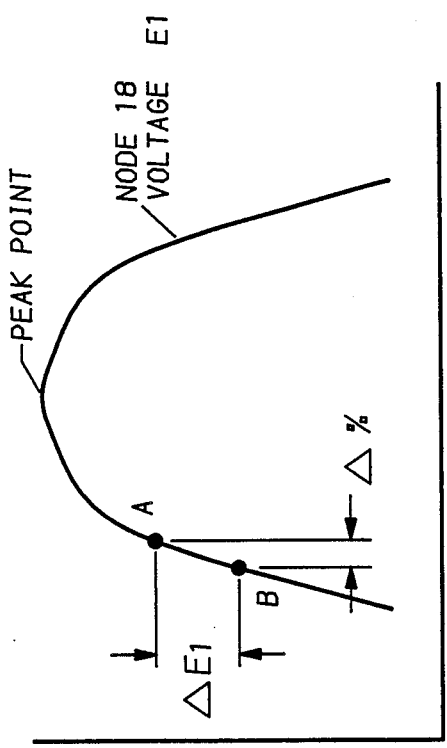
FIGS. 3 and 3A show the basic circuit of the system.
Figure 3:
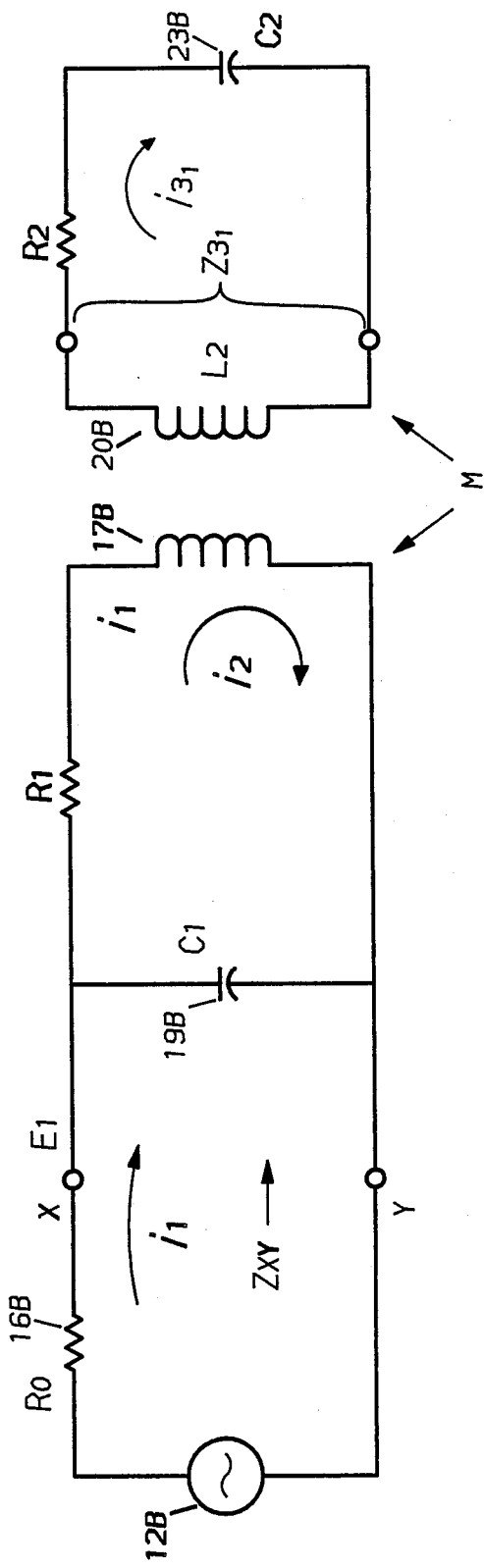

The identifier circuit of FIG. 3A looks the same to the reader as does that of FIG. 3.

$$Z2 = R2 + j(WL2 - 1/WC2),$$

and $$Z2 = jWL2 + R2 - j/WC2,$$

or $$Z2 = jWL2 + Z3.$$

$$Z3 = R2 - j/WC2;$$

also $$Z3 = R2 // 1/jWC2,$$

and $$Z3 = \frac{R3 \ (1/jWC3)}{R3 + (1/jWC3)}.$$

The values for R3 and C3 in terms of R2 and C2 are:

$$R3 = \frac{1 + (WR2C2)^2}{W^2 \ (C2)^2 \ R2}$$

and:

$$C3 = \frac{C2}{1 + (WR2C2)^2}.$$

The inverse equations giving the values of R2 and C2 in terms of R3 and C3 are:

$$R2 = \frac{R3}{1 + (WR3C3)^2}$$

and:

$$C2 = \frac{1 + (WR3C3)}{W^2 \ (R3)^2 \ C3}.$$

For a typical Q value of 100, the series resistance R2 will be a few tenths of an ohm, and the equivalent parallel R3 will be above 1,000 ohms. Modulation in the identifier is achieved by varying the value of R3 with field affect transistors 30 and 31. The voltage E1 is modulated by the identifier.

In FIG. 1, the voltage E1 is passed through a capacitor 45 to eliminate the direct current component. The diodes 46 and 47 peak detect the signal. The radio frequency component of the signal is shunted to ground by the capacitor 49. A resistor 50 allows a steady leakage current such that the diode rectifying action can continue to follow the envelope waveform. At the node 48 there is a voltage equal to the envelope voltage. The signal is an audio frequency or data frequency signal representing the logic signal generated by the logic/memory circuit of the identifier. This data signal is transmitted through a capacitor 51 and biased by the resistors 52 and 54 to be amplified by the cascaded amplifiers 55, 56 and 57. The amplifier 57 is selected to limit or square off the signal thereby forming logic level signals while retaining the time transitions and the width of the signals which bear the information. Thus the data of the identifier 11 is delivered at the output terminals of the reader 10.

Figure 4:
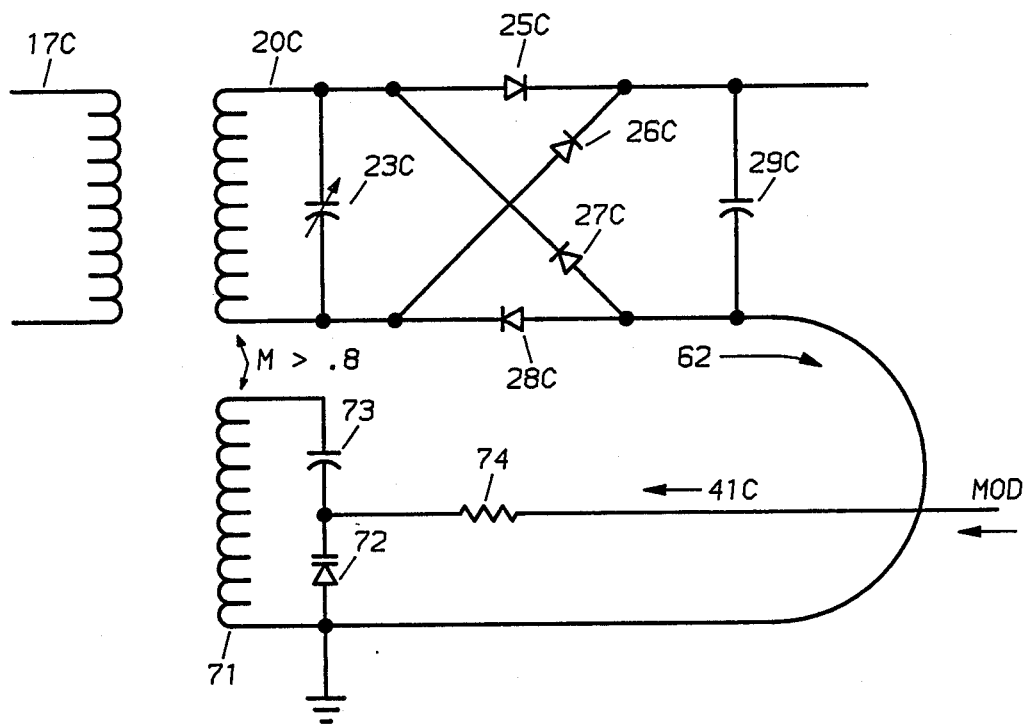
FIG. 4 shows a high Q variable capacitor method of modulation.

In FIG. 4 is shown a modulation method which neither interrupts nor loads the source of power, but rather changes the phase angle of the resonant coil of the identifier. Changing the phase angle is equivalent to changing the reactance of the identifier, and in the extreme case, the reactance can change from inductive to capacitive reactance. The effect on the primary coil 17 is the same as previously described, and is the same as shown in FIG. 2, and has the same analytical relationship as shown in the calculations.

In FIG. 4 this change in reactance is achieved by varying the capacitance of a varactor 72. The coils 17C and 20C, capacitors 23C and 29C, diodes 25C and 28C, and the line 41C all act as did their counterparts of similar identification in FIG. 1. The coil 20C and the diodes provide power for the card as before. Closely coupled to and built on the card in the same plane and same axis as the coil 20C, is a coil 71. This shunting coil circuit includes the capacitor 73 and the capacitance of the varactor 72. These two capacitances contribute to the resonance circuit of the identifier. The overall resonance circuit includes the coils 20C and 71, which are so closely coupled as to act as a single coil, and the capacitances 23C, 73 and 72. As the line 41C rises and falls with the logic command, the voltage on the varactor 72 rises and falls. A low voltage on the varactor causes maximum capacitance that is equivalent to minimum capacitive reactance. A high voltage on the varactor causes minimum capacitance and maximum capacitive reactance. The varactor is a high quality high Q form of capacitance.

The total capacitance across the coil 71 falls and rises with the change in voltage on the varactor 72, and the capacitive reactance across the coil 71 correspondingly rises and falls just as the phase angle of the circulating current within the coil 71 varies. The change in phase of the circulating current is mutually coupled and added vectorially to the phase angle of the voltage and the current in the coil 17C. The voltage on the coil 17C rises and falls as shown in FIG. 2. The resistor 74 allows the slow rise time command voltage (several microseconds) to pass to the varactor, but prevents the radio frequency signal (over 10 Mhz) present in the coil circuit from being shunted by the logic drive. The rise and fall of the voltage on the coil 17 (17C in FIG. 4) is detected and amplified as explained earlier for FIG. 1.

The significant advantage of using the varactor is that for either the high or low value of its reactance, power can flow continuously from coil 17C to coil 20C through the diode rectifiers to the capacitor 29C so that maximum energy or watt-seconds is available to power the logic of the card. Other circuits cause some loss of power through either loading or through interruption. Furthermore, the varactor is much preferred, and in fact necessary for capacitance variation in radio frequency circuits, compared to a series transistor and capacitor because the transistor has a unidirectional current nature and has an ohmic impedance and losses which prevent it from being used in high-Q resonant circuits. The varactor has a high-Q.

It is further possible, through the use of the varactor, to choose the values of reactance and the natural frequencies (where inductive and capacitive reactances are equal), so that as the varactor causes change from value A to value B, it moves the identifier toward the identifier natural frequency, and hence produces more voltage while the sensor 17C delivers less voltage since having moved from point A to B. The two effects compensate one another, thus maintaining a relatively level supply voltage to the identifier logic.

Figure 5:
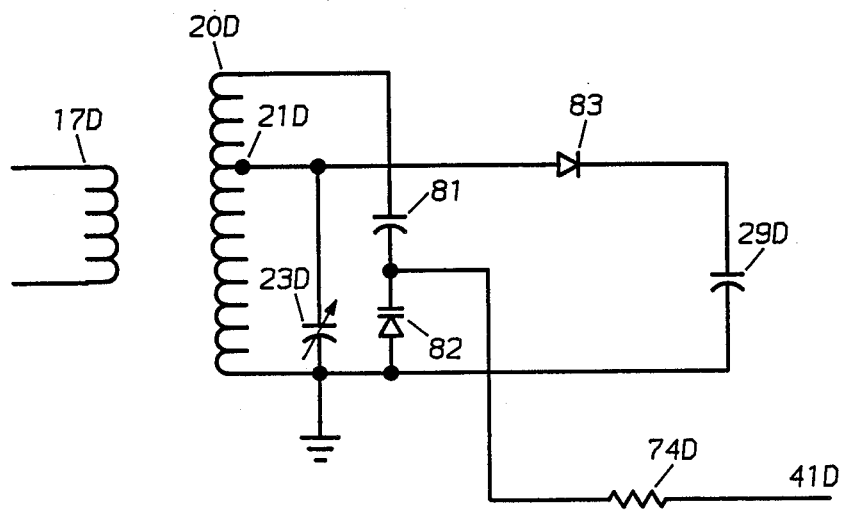
FIG. 5 shows a simplified high Q variable capacitor method of modulation.

A variation and simplification of the varactor modulator is shown in FIG. 5. In this embodiment rather than using a full wave diode bridge and two coils, there is a single coil 20D acting as an auto transformer at radio frequencies with one side at identifier ground. A single diode 83 provides power rectification to the capacitor 29D. The principal part of the resonant capacitance is provided by the capacitor 23D connected at the tap 21D, and the remaining portion of the resonant capacitance is provided by the capacitor 82 and the varactor 82. The varactor capacitance is varied by varying the voltage on line 41D through resistor 74D as explained for FIG. 4. This circuit is preferred over the circuit of FIG. 4 because of its simplifications. The circuit continues to have the important advantage of the FIG. 4 circuit, namely that of allowing power to flow at all times from the reader to the logic within the identifier card.

The power requirement of the identifier to meet the needs of maximum range and minimum radiation is kept low, as stated previously, by the following steps which have been described. First, the power supply within the identifier is interrupted and the load is diminished during modulation, rather than having the load increased during modulation. Diminishing the load achieves modulation effects yet does not cause energy loss in the identifier and retains power for functioning of the identifier. Other circuits have undesired power loss. Second, for the capacitive reactance variation with the varactor modulation circuits of this invention, power is available uninterruptedley even though modulation action is occurring, thereby resulting in optimum power availability for the logic.

I claim:

1. An identification system comprising:
a reader,
a portable identifier,
said reader including:
a first signal generator for operating a first signal,
a first antenna connected to radiate said first signal, and
said portable identifier including:
a second antenna mutually coupled to said first antenna to receive radiation power from said first antenna and to send signals to said first antenna,
a data generating circuit powered by said radiation power; and
a circuit causing said data to modulate the electrical properties of said second antenna, and through said mutual coupling thereby affect the electrical properties of said first antenna, and
said reader further containing a circuit for detecting changes in said electrical properties of said first antenna to thereby identify said portable identifier by detecting said data.

2. An identification system as defined in claim 1 wherein said first antenna is a loop antenna with an inductive reactance value.

3. An identification system as defined in claim 2 in which said second antenna is a loop antenna with a reactive value.

4. An identification system as defined in claim 1 in which said first signal is a fixed frequency radio frequency signal.

5. An identification system as defined in claim 1 in which said modulated electrical behavior is a change in reactance of the circuit of said second antenna.

6. An identification system as defined in claim 5 in which said change in reactance of second antenna circuit effects a change in reactance of said first antenna, and hence a change in voltage across said first antenna.

7. An identification circuit as defined in claim 6 in which said reactance change is produced by interrupting power flow from said second antenna to said data encoding circuits.

8. An identification system as defined in claim 6 in which said reactance change in said second antenna is produced by a high-Q variable capacitor.

9. An identification circuit as defined in claim 8 in which said high-Q variable capacitor is a varactor diode.

10. An identification system as defined in claim 6 in which said reactance changes in said second antenna are chosen to be of value such that reactance-induced voltage changes across said second antenna are of opposite magnitude to reactance induced voltage changes in said first antenna, thereby producing a more nearly level power supply to said data encoding circuits in said identifier.

* * * * *